United States Patent [19]
Skinner et al.

[11] Patent Number: 5,965,964
[45] Date of Patent: Oct. 12, 1999

[54] METHOD AND APPARATUS FOR A DOWNHOLE CURRENT GENERATOR

[75] Inventors: Neal G. Skinner, Lewisville; Paul D. Ringgenberg, Carrollton, both of Tex.

[73] Assignee: Halliburton Energy Services, Inc., Dallas, Tex.

[21] Appl. No.: 08/931,762

[22] Filed: Sep. 16, 1997

[51] Int. Cl.$^6$ ............................ H02K 35/00; H02K 35/02
[52] U.S. Cl. ................................. 310/15; 310/12
[58] Field of Search ................... 310/12, 13, 15, 310/20; 367/81, 82, 83, 84, 85; 290/54

[56] References Cited

U.S. PATENT DOCUMENTS

| | | | |
|---|---|---|---|
| 3,896,667 | 7/1975 | Jeter | 73/151 |
| 4,454,426 | 6/1984 | Benson | 310/15 |
| 4,491,738 | 1/1985 | Kamp | 310/17 |
| 4,825,421 | 4/1989 | Jeter | 367/83 |
| 5,073,877 | 12/1991 | Jeter | 367/84 |
| 5,115,415 | 5/1992 | Mumby et al. | 367/85 |
| 5,389,844 | 2/1995 | Yarr et al. | 310/15 |
| 5,517,464 | 5/1996 | Lerner et al. | 367/84 |
| 5,592,438 | 1/1997 | Rorden et al. | 367/83 |

*Primary Examiner*—Clayton LaBalle
*Attorney, Agent, or Firm*—Paul I. Herman; Russell N. Rippamonti

[57] ABSTRACT

A downhole current generator generates power in a wellbore and includes a power section and an generator section. The power section has a sleeve slidably disposed within a housing which oscillates in response to the application of fluid pressure to the current generator. A piston is slidably attached to the sleeve and oscillates relative to the sleeve and the housing. The piston extends longitudinally into an generator section and has a plurality of magnets attached thereto which oscillate with the piston. Wire coil sections are fixed relative to the housing of the generator section and are positioned between the oscillating magnets such that a current is induced in the wire coil sections upon oscillation of the magnets.

10 Claims, 17 Drawing Sheets

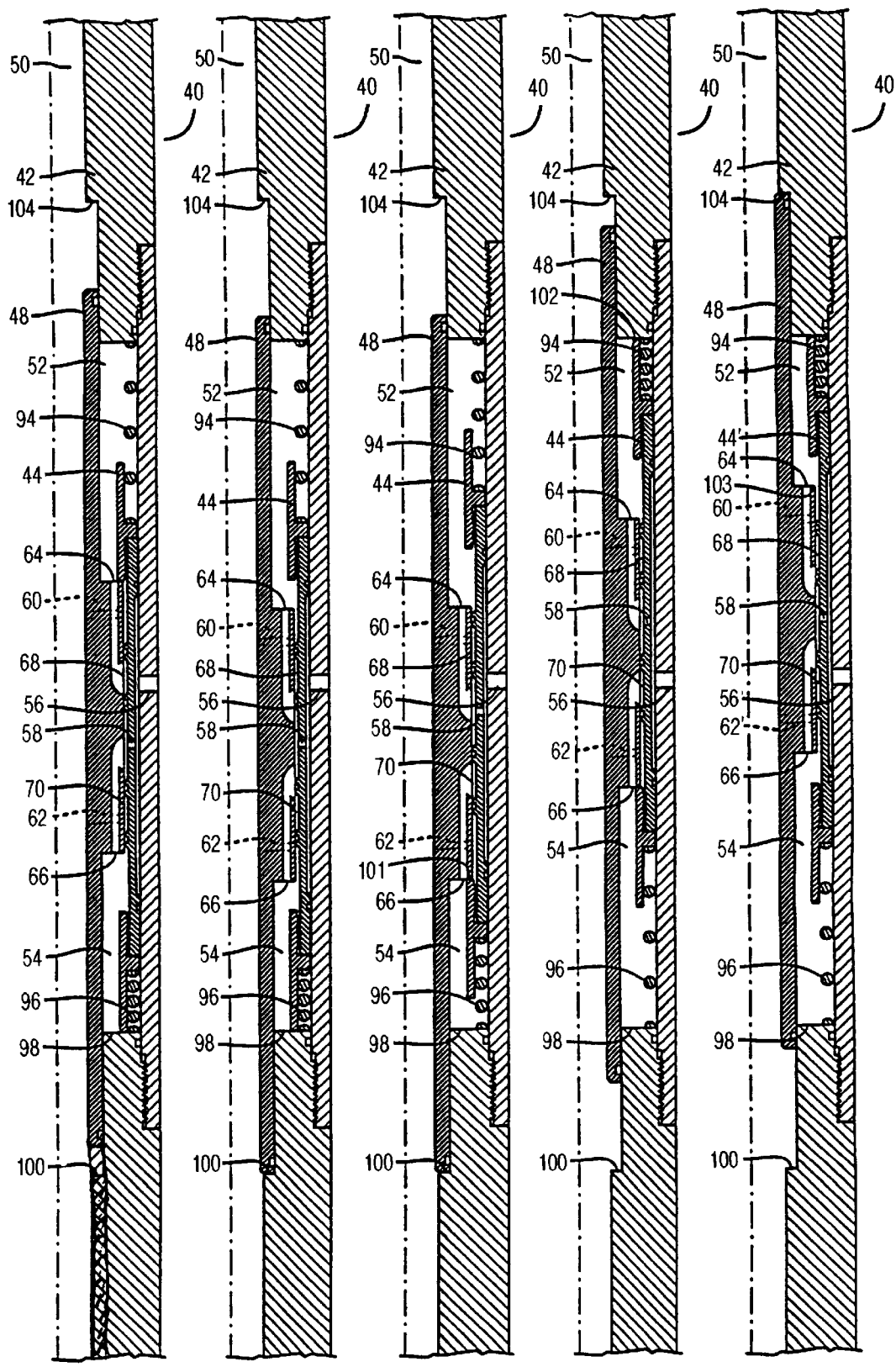

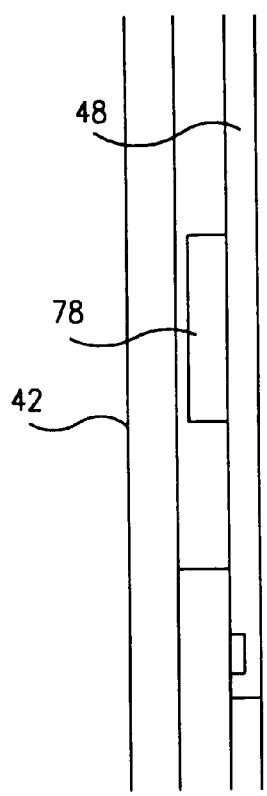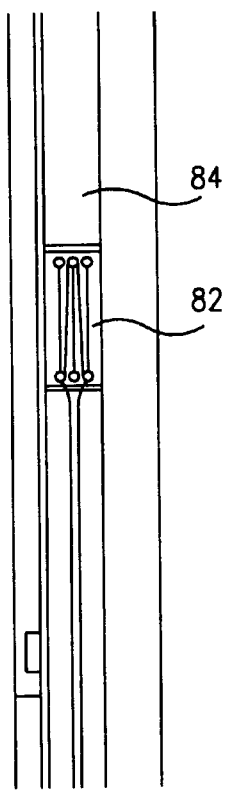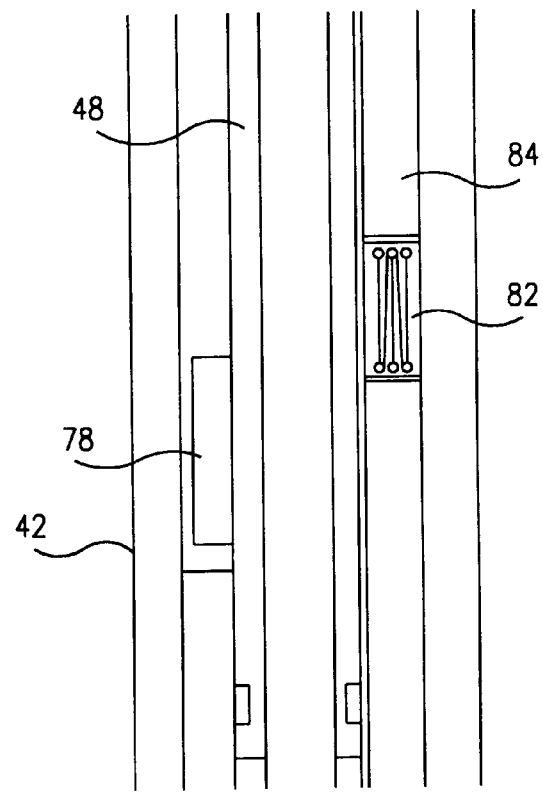
FIG. 5D  FIG. 5E

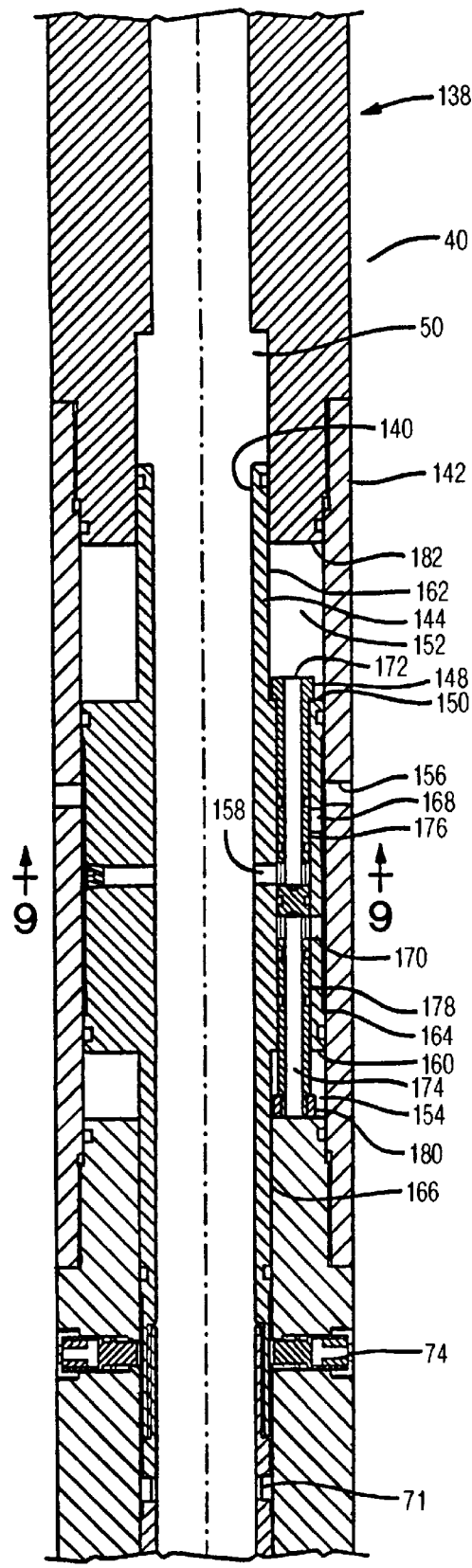
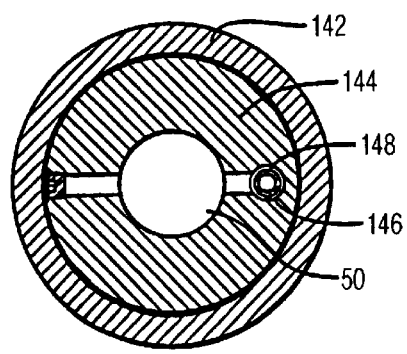
FIG. 9A
FIG. 10A

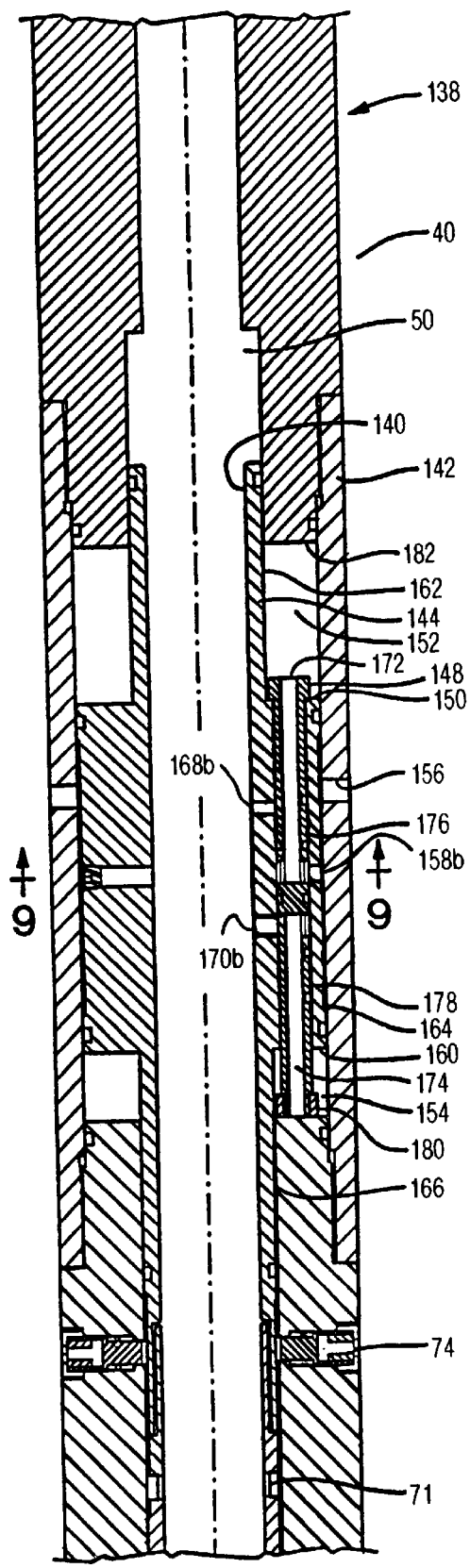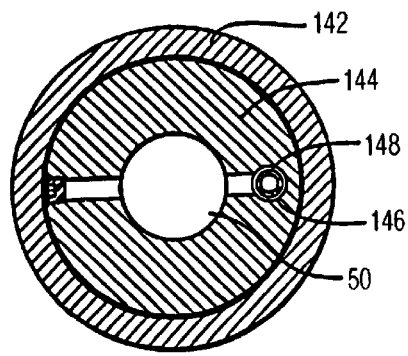
FIG. 9B
FIG. 10B

METHOD AND APPARATUS FOR A DOWNHOLE CURRENT GENERATOR

INCORPORATION OF RELATED APPLICATIONS

This application incorporates by reference the related U.S. Patent Application entitled, "Automatic Downhole Pump Assembly and Method for Use of the Same," by Neal G. Skinner and Paul D. Ringgenberg, having Ser. No. 08/657,265, and filed on Jun. 3, 1996 now U.S. Pat. No. 5,807,082.

TECHNICAL FIELD OF THE INVENTION

This invention relates in general to generation of current, and more particularly to the generation of current using a generator and a downhole pump assembly.

BACKGROUND OF THE INVENTION

During the course of drilling an oil or gas well, various operations often require a downhole electric power source. For example, a power source is required to operate circuits and instruments that measure the production capabilities of a well during the initial drilling of an oil well. In the prior art, batteries are typically used to provide the necessary power in a well.

However, a significant problem with the use of batteries as a power supply in a downhole environment is their limited life expectancy. Failure of a battery in a downhole power source can cause much delay and expense.

For example, one operation which is often performed during the course of drilling an oil or gas well is to lower a testing string into the well to test the production capabilities of hydrocarbon producing underground formations intersected by the well. Testing is typically accomplished by lowering a string of pipe, generally drill pipe or tubing, into the well with a packer attached to the string at its lower end. Once the test string is lowered to the desired final position, the packer is set to seal off the annulus between the test string and the wellbore or casing, and the underground formation is allowed to produce oil or gas through the test string. Measurements of pressure and temperature are then taken by transducers within the string, and the data is either stored in a memory, such as a random access memory (RAM) chip, within the testing circuit or transmitted to the surface. Depending on the data required for well test objectives, testing may last anywhere from one day to two weeks.

If a battery required by the downhole power source for the down hole instrument fails prior to the completion of testing, the testing string must be pulled back to the surface and the battery replaced or valuable rig time may be wasted on testing with no recorded data. This procedure causes an interruption in the collection of data as well as delay and further expense in the drilling process.

In addition, batteries can only provide a limited amount of power even when fully charged. This disadvantage limits the use of circuits requiring higher power in a downhole environment.

Accordingly, a need has arisen in the industry for a method and apparatus to extend the life of a downhole power source and/or increase the amount of power output from a downhole power source.

SUMMARY OF THE INVENTION

The present invention is directed to a downhole current generator for generating current in a wellbore. The current generator includes a power section, which includes a first housing, a sleeve slidably disposed within the first housing such that the sleeve oscillates axially within the housing in response to changes in fluid pressure within the wellbore, and a piston slidably disposed within the sleeve to oscillate axially relative the sleeve and the housing. The current generator further includes a generator section, wherein the alternator section includes a second housing attached to the power section and defining an interior volume into which the piston of the power section extends, at least two magnets attached to the piston such that the magnets oscillate in response to the oscillation of the piston, and a wire coil section fixed relative to the second housing of the alternator section and positioned to overlap the two magnets.

BRIEF DESCRIPTION OF THE DRAWINGS

For a more complete understanding of the present invention, including the features and the advantages thereof, reference is now made to the following detailed descriptions taken in conjunction with the accompanying drawings, in which like numerals are used for like parts.

FIGS. 3A–E illustrate quarter-sectional views of the operation of a power section of the current generator of the present invention;

FIGS. 5A–E illustrate cross-sectional views of an alternate embodiment of the alternator section of the current generator of the present invention;

FIG. 9A illustrates a half-sectional view of an alternate embodiment power section of a downhole current generator of the present invention;

FIG. 10A illustrates a cross-sectional view of the power section depicted in FIG. 9A taken along line 9—9;

FIG. 9B illustrates the power section shown in FIG. 8A, modified to operate under annulus pressure; and FIG. 10B illustrates a cross-sectional view of the power section depicted in FIG. 9B taken along line 9—9.

DETAILED DESCRIPTION OF THE INVENTION

Figure 1:
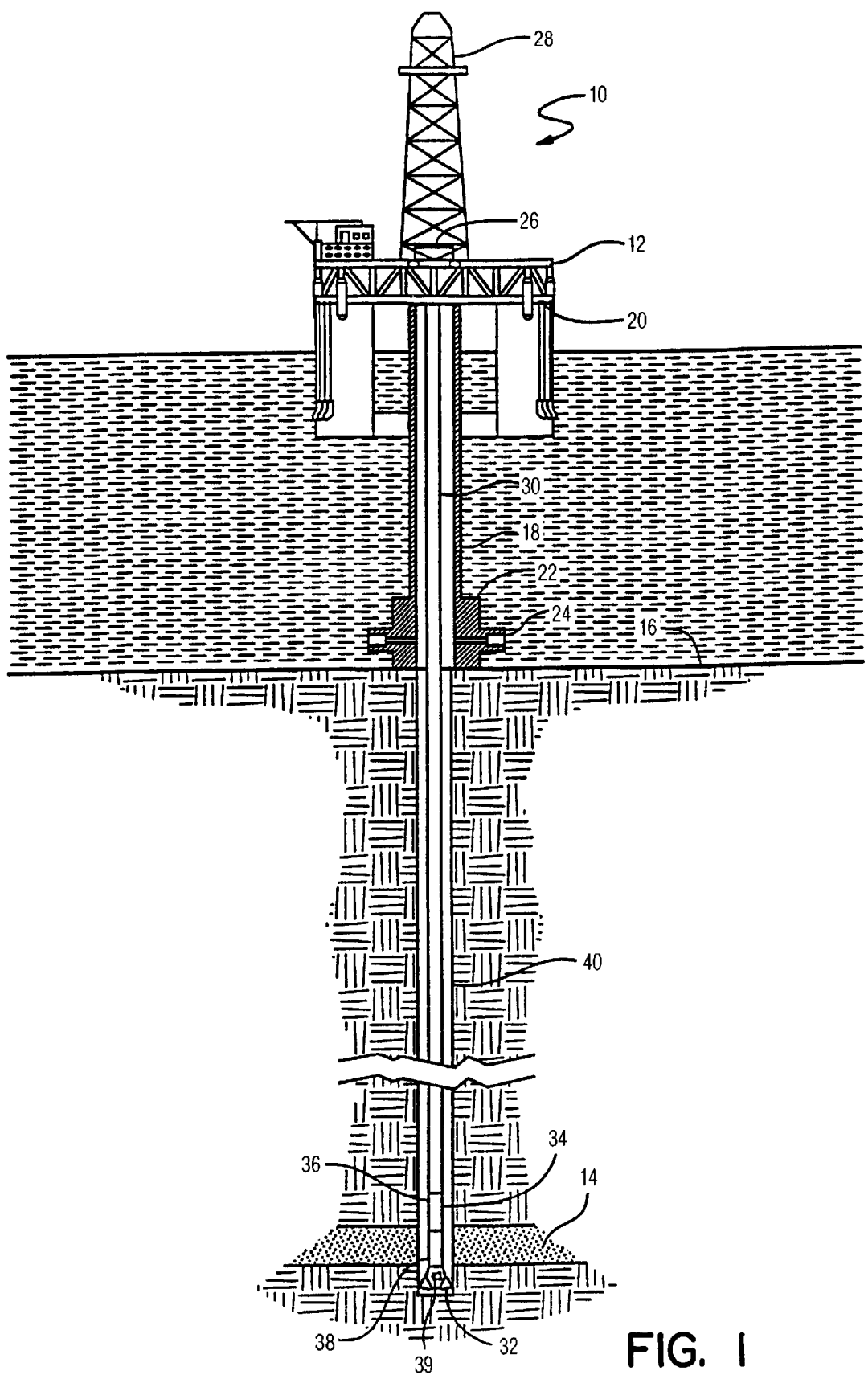
FIG. 1 illustrates a schematic of an offshore oil or gas drilling platform operating the downhole current generator of the present invention.

In FIG. 1, an offshore oil or gas platform which includes the downhole current generator 34 of the present invention is shown. A semisubmersible drilling platform 12 is centered over a submerged oil or gas formation 14 located below sea floor 16. A subsea conduit 18 extends from a deck 20 of a platform 12 to a well head installation 22 including blowout preventors 24. The platform 12 has a derrick 28 and a hoisting apparatus 26 for raising and lowering the drill string 30. The drill string 30 includes a drill bit 32, tools or sensors 39 requiring electric power to test or measure properties of downhole functions 14 and a downhole current generator 34. The current generator 34 includes a power section 36 and a generator section 38.

The current generator 34 of the present invention is not limited to use with drill string 30 on an offshore rig as shown in FIG. 1. The current generator 34 may also be incorporated into a probe that is inserted in the drill sting 30 or used with conventional offshore drilling rigs or during onshore drilling operations. In addition, a current generator 34 may be used in any number of well service operations, including during formation testing. In the operation of the current generator 34, the tubing pressure inside the drill string 30 can be elevated by adjusting the flow of fluid through the drill string 30. The change in tubing pressure causes the internal mechanisms within the power section 36 to oscillate, as described in more detail below. In response to the oscillating mechanisms within the power section 36, a plurality of magnets within the alternator section 38 repeatedly cross over coil wires also located in the alternator section 38. This oscillation of the magnets with respect to the coil wires creates a changing magnetic flux across the coil wires. As a result, an alternating current is generated within the coil wires. The alternating current generated by the current generator 34 may be converted to DC current with an AC/DC converter, if necessary.

The current generated by the current generator 34 may be used to supplement the power of batteries in a downhole power source. The additional current generated by the current generator 34 can increase the power output to operate circuits requiring higher power. By supplementing the electrical power provided by the downhole battery, the present invention enables the use of circuits, sensors, instruments on control valves, etc., requiring higher power than what could previously be provided by downhole batteries. In addition, the current generated by the current generator 34 may be used to temporarily replace the battery as in a downhole power source. By allowing less use of the battery, the present invention increases the life of downhole batteries. In addition, the invention may be used to recharge rechargeable downhole batteries.

The current generator 34 of the present invention may also be regulated to provide a varying supply of current. For example, the amplitude of the current generated may be increased by increasing the rate of oscillation through adjustments in the amount of fluid flowing through the drill string 30. When the current generator 34 is no longer needed, the tubing pressure may be reduced which in turn causes the power section 36 to stop pumping and current generation to cease. Other drilling operations may then resume.

Figure 2A:
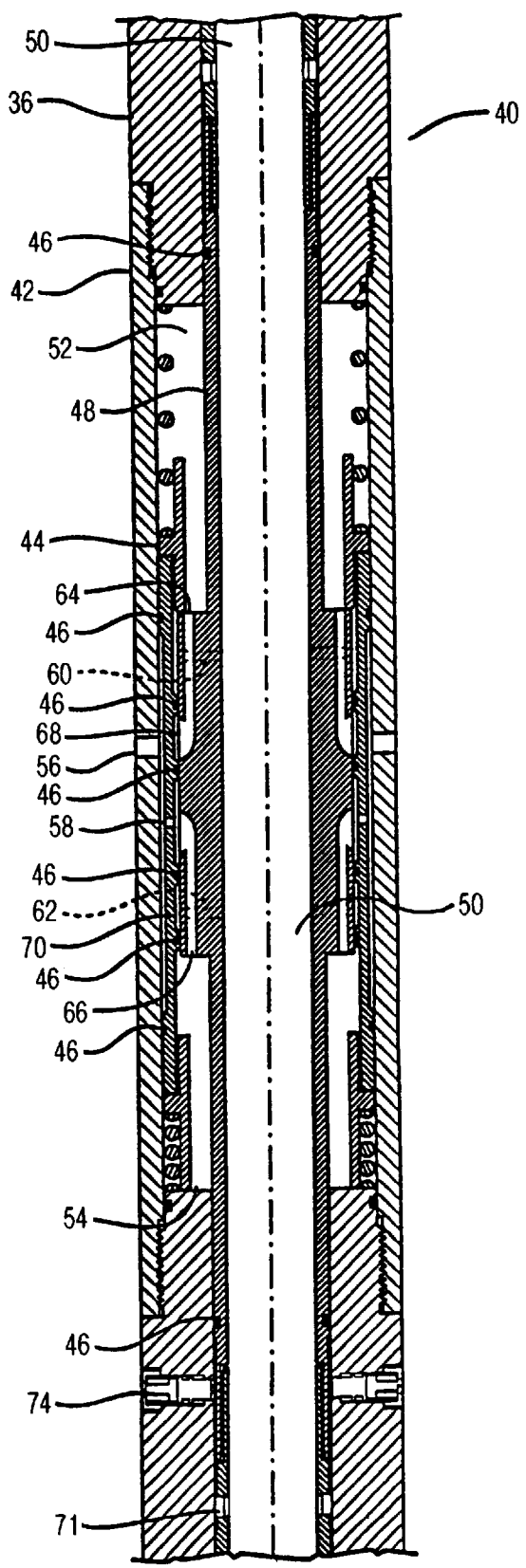
FIG. 2A illustrates a half-sectional view of the power section of the downhole current generator of the present invention.
Figures 2B, 2C:
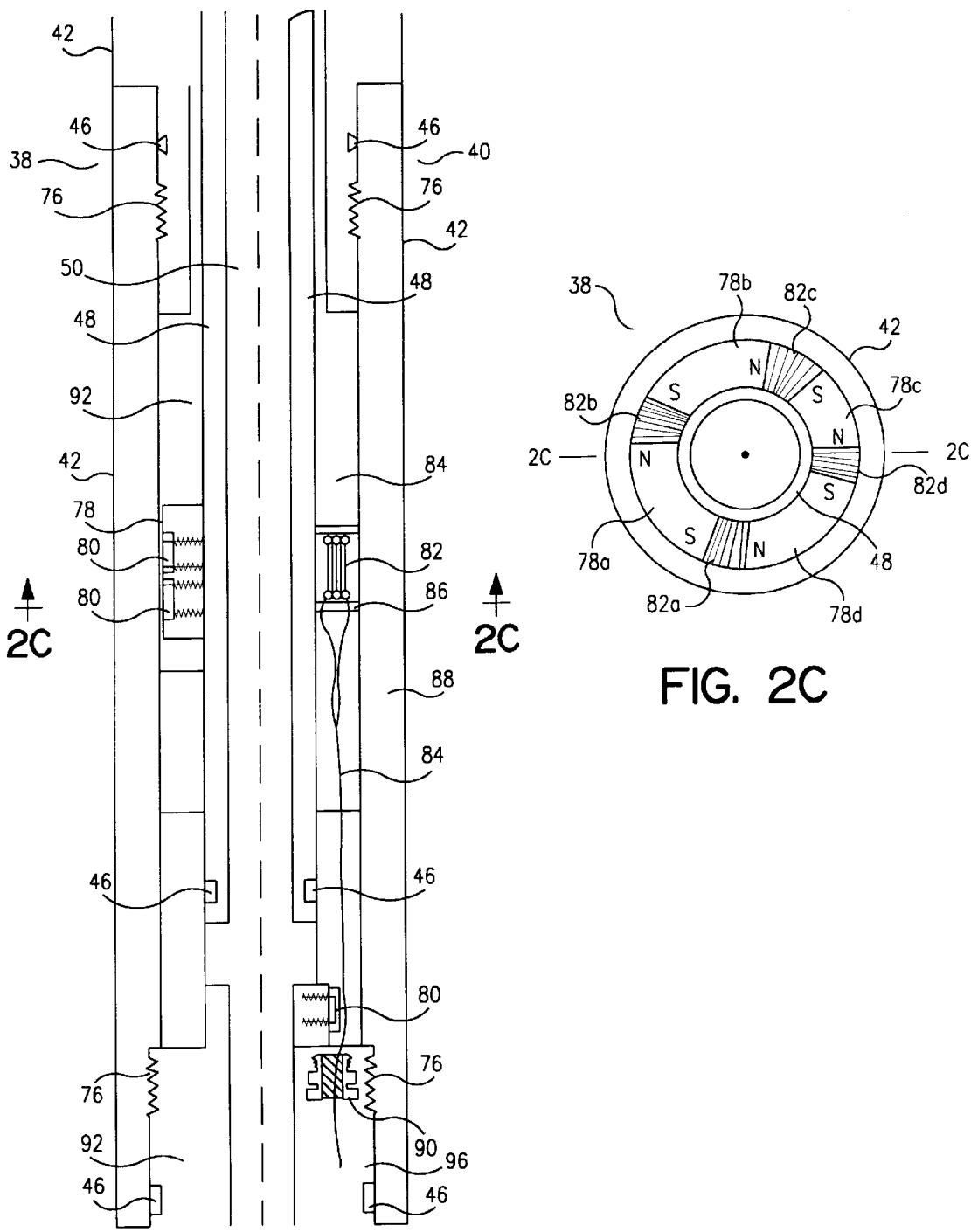
FIG. 2B illustrates a half-sectional view of the alternator section of the downhole current generator of the present invention.
FIG. 2C illustrates a cross-sectional view of the alternator section of the downhole current generator of the present invention.

The power section 36 and the alternator section 38 of the current generator 34 are shown in more detail with reference to FIGS. 2A–2C. FIG. 2A illustrates the power section 36 in more detail. Specifically, the power Section 36 includes a housing 42 which may be threadably connected to the drill string 30 at its upper and lower ends. A sleeve 44 is slidably disposed within the housing 42. Multiple annular seals 46, such as O-rings, are disposed between the sleeve 44 and the housing 42 to provide a seal therebetween. The piston 48 defines an interior volume 50 which includes the centerline of the drill string 30. Multiple annular seals 46 are also disposed between the piston 48 and the interior of the housing 42 to provide a seal therebetween.

Between the housing 42 and the piston 48 is an upper chamber 52 and a lower chamber 54. The housing 42 defines a fluid passageway 56 which is in communication with the wellbore 40. Sleeve 44 defines a fluid passageway 58 which is in communication with the fluid passageway 56 of the housing 42. The piston 48 defines an upper radial fluid passageway 60 and a lower radial fluid passageway 62. The upper radial fluid passageway 60 and the lower radial fluid passageway 62 are in communication with the interior volume 50. The piston 48 also defines an upper axial fluid passageway 64 which is in communication with the upper chamber 52 and the lower axial fluid passageway 66 which in turn is in communication with the lower chamber 54. Between the piston 48 and the sleeve 44 is an upper volume 68 and a lower volume 70. The piston 48 also defines a groove 71 which accepts a plurality of locking members 74. The locking members 74 prevent relative axial movement between the piston 48 and the housing 42 when the tubing pressure inside the interior volume 50 is less than a predetermined value, such as during drilling operations. When the tubing pressure inside the interior volume 50 exceeds the annulus pressure by a predetermined value, the bias force of the springs within the locking members 74 is overcome. This reduction in the bias force allows the locking members 74 to retract, thereby allowing the piston 48 to move axially relative to housing 42.

As the piston 48 moves up and down axially, the upper radial fluid passageway 60 is alternately in communication with the upper chamber 52 and the upper volume 68. The upper axial fluid passageway 64 is alternately in communication with the upper volume 68 and the fluid passageway 58 of the sleeve 44. The lower radial fluid passageway 62 is alternatively in communication with the lower chamber 54 and the lower volume 70. The lower axial fluid passageway 66 is alternatively in communication with the lower volume 70 and the fluid passageway 58 of the sleeve 44.

The alternator section 38 of the current generator 34 is shown in more detail in FIGS. 2B and 2C. FIG. 2B illustrates a half-sectional view of the alternator section 38, and FIG. 2C illustrates a cross-sectional view of the alternator section 38 of FIG. 2B along line 2C—2C. The alternator section 38 is threadably attached 76 to the power section 36. Multiple 0-rings 46 provide a tight seal between the threads 76 and the housing 42. The piston 48 extends longitudinally from the power section 36 to the alternator section 38.

As seen in the cross-sectional view of FIG. 2C, the alternator section 38 includes multiple magnets 78 and wire coil sections 82. The magnets 78 are attached to the piston 48 while the wire coil sections 82 are attached to the housing 42 such that the magnets 78 oscillate across wire coil sections 82. Though FIG. 2C illustrates four magnets 78 and four wire coil sections 82, a person of ordinary skill in the art will appreciate that the combination of magnets and wire coil sections is not limited to four. It has been found that the wire coil sections 82 should be relatively thin in comparison to the magnets 78 so that the magnetic field exerted by the magnets 78 across each wire coil sections 82 is generally uniform and strong.

The magnets 78 are attached to the piston 48 with capscrews 80, as seen in FIG. 2B. A person of ordinary skill in the art will appreciate that the magnets 78 may be attached to the piston 48 using other methods, such as adhesives. The housing 42 defines a space 92 wherein each magnet 78 oscillates in response to the oscillation of the piston 48. In this embodiment of the invention, each magnet 78 is positioned such that it fully extends across the wire coil 48 at the lowest position of the piston 48 relative to the housing 42. The housing 42, the sleeve 44 and the piston 48 are preferably composed of a high non-magnetic strength metal with good corrosion resistance such as a chromium-nickel alloy sold under the trademark MP-35-N™ by Latrobe Special Products Div. in Latrobe, Pa. or sold under the trademark INCONEL™ alloy 718 by Inco Alloys International, Inc. of Huntington, W.Va.

The wire coil sections 82 are each attached to finger pieces 84 which are alternately positioned between the magnets 78 within the housing 42. The finger pieces 84 are attached by a capscrew 80 to a section 92 such that the finger pieces 84 remain immobile within the housing 42 while the magnets 78 oscillate with the piston 48 across the wire coil sections 82.

The finger pieces 84 are preferably made of a plastic, or other non-metallic and nonconductive material, having a high rigidity and high stability at high temperatures. Polyether ester ketone or PEEK is preferably used as the material for the finger pieces 84, though other materials with appropriate properties may be used as well. As shown in FIG. 2B, bobbins 86 are attached to the finger pieces 84. The wire coils 82 are wrapped around the bobbins 86 multiple times to form a thick layer of coils. Similarly to the finger pieces 84, each bobbin 86 is preferably formed from a plastic or other non-metallic and non-conductive material, such as PEEK, to prevent generation of eddy currents which may create heat or additional magnetic fields.

The magnets 78 generate a magnetic field across the wire coil sections 82 from the north pole to the south pole of adjacent magnets. Specifically, the magnetic fields are generated from the north pole of magnet 78a to the south pole of magnet 78b, from the north pole of magnet 78b to the south pole of magnet 78c, from the north pole of magnet 78c to the south pole of magnet 78d, and from the north pole of magnet 78d to the south pole of magnet 78a. The wire coils 82 are positioned such that the direction of the magnetic field generated by the magnets 78 is perpendicular to the diameter of the wire coil sections 82.

Another downhole section 92 is threadably attached 76 to the alternator section. Two current wires 84 conduct the alternating current generated by the alternator section 38 to the other downhole section 92. The current wires 84 are attached to the other downhole section 92 via a feed through 90, as made by Kemlon in Houston, Tex. The other downhole section 92 may contain an AC-to-DC convertor to convert the alternating current generated by the alternator section 38 to a direct current, as well as a downhole power source, such as a battery, or other circuits which would benefit from the current generated by the alternator section 38.

In an alternate embodiment (not shown), the wire coil sections 82 are attached instead to the piston 48 while the magnets 78 remain immobile within the housing 42. The magnets 78 generate a magnetic field through which the wire coil sections 82 oscillate as they travel with the piston 48.

The operation of the current generator 34 is now explained in more detail with reference to FIGS. 3A through 3E and FIGS. 4A through 4E.

In FIGS. 3A–3E, the operation of the power section 36 of the current generator 34 is depicted. In the first step, the interior pressure of the volume 50 within the drill string 30 is increased. For example, engine surface pumps may pump fluid into the well to increase the pressure within the interior volume 50. During the formation testing of a well, one or more packers may also seal the area between the wellbore 40 and the housing 42 such that the formation 14 is isolated from the rest of the wellbore 40. As a result of the increased pressure, the fluid from the interior volume 50 enters the upper chamber 52 through the upper radial fluid passageway 60. The fluid from the lower chamber 54 enters the wellbore 40 through the lower axial fluid passageway 66, and hence, through the fluid passageway 58 of the sleeve 44, and finally through the fluid passageway 56 of the housing 42. The high pressure fluid in the chamber 52 urges the sleeve 44 and the piston 48 downward relative to the housing 42. The upper coil spring 94 further urges the sleeve 44 downward relative to the housing 42. The sleeve 44 travels downward until it contacts the shoulder 98 of the housing 42 as depicted in FIG. 3A.

The high pressure in the chamber 52 continues to urge the piston 48 downward relative to the housing 42 and the sleeve 44 after the sleeve 44 contacts the shoulder 98. The piston 48 continues to travel downward relative to the sleeve 44 until the radial fluid passageway 60 is in communication with the upper volume 68, the upper axial fluid passageway 64 is in communication with the fluid passageway 58 of sleeve 44, the lower radial fluid passageway 62 is in communication with the lower chamber 54, and the lower axial fluid passageway 66 is in communication with the lower volume 70. This completes the downward stroke of the piston 48. Once the downward stroke of the piston 48 has been completed, the pressure in the upper chamber 52 and in the lower chamber 54 is equalized. This removes all of the hydraulic force on the sleeve 44 as depicted in FIG. 3B.

The lower coil spring 96 urges the sleeve 44 upward until the sleeve 44 contacts the shoulder 101 of the piston 48 as depicted in FIG. 3C. High pressure fluid from the interior volume 50 enters the lower chamber 54 through the lower radial fluid passageway 62 while the fluid from the upper chamber 52 enters the wellbore 40 through the upper axial fluid passageway 64, then through the fluid passageway 58 of the sleeve 44, and finally through the fluid passageway 56 of the housing 42. The high pressure fluid in the chamber 54 urges the sleeve 44 and the piston 48 upward relative to the housing 42. The piston 48 and the sleeve 44 travel upward together until the sleeve 44 stops against the shoulder 102 of the housing 42 as depicted in FIG. 3D.

The high pressure fluid in the lower chamber 54 continues to urge the piston 48 upward until the upper radial fluid passageway 60 is in fluid communication with the upper chamber 52, the upper axial fluid passageway 64 is in fluid communication with the upper volume 68, the lower radial fluid passageway 62 is in fluid communication with the lower volume 70 and the lower axial fluid passageway 66 is in fluid communication with the fluid passageway 58 of the sleeve 44. This ends the upward stroke of the piston 48 and allows the pressure in the upper chamber 52 and the lower chamber 54 to equalize and thus remove all hydraulic forces on the sleeve 44, as depicted in FIG. 3E. The upper coil spring 94 urges the sleeve 44 downward until the sleeve 44 contacts the shoulder 103, which allows fluid from the interior volume 50 to enter the upper chamber 52. This starts the downward cycle again.

Figures 4A, 4B:
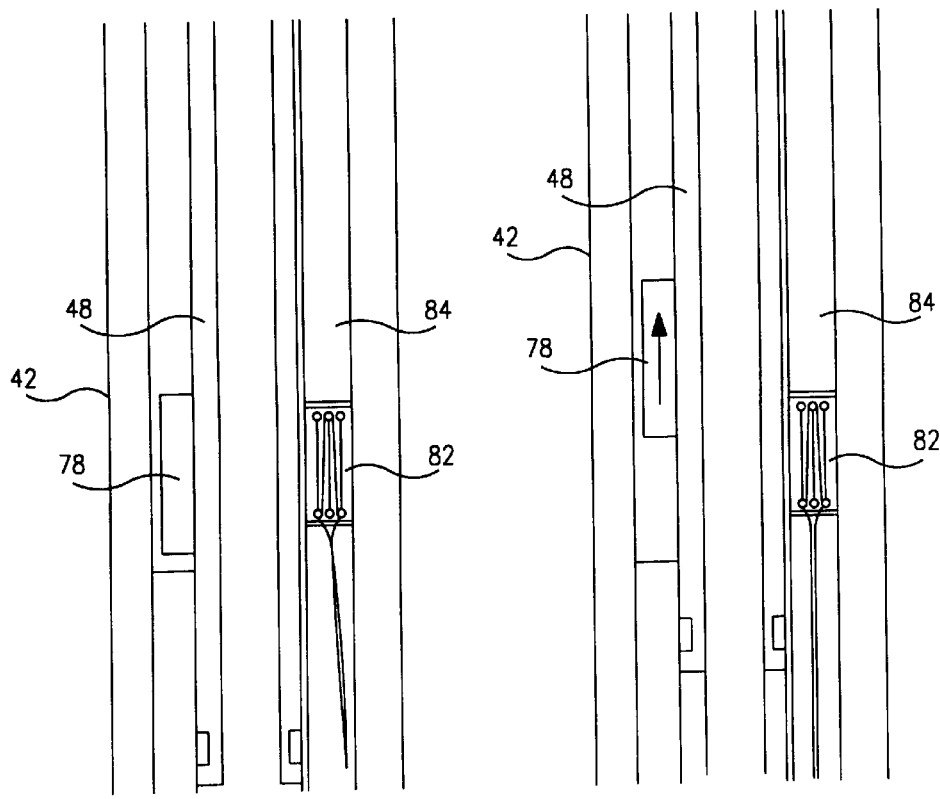
FIGS. 4A–E illustrate half-sectional views of the alternator section of the current generator of the present invention.

The operation of the alternator section 38 in conjunction with the operation of the power section 36 is now described with reference to FIGS. 4A through 4E. In FIG. 4A, the piston 48 is at its lowest position (as shown in FIG. 3B). The magnets 78 on the alternator section 38 extends completely across the wire coil sections 82. As the piston 48 oscillates in an upward axial direction within housing 42, the magnets 78 move with the piston 48 and across the wire coils 82, as shown in FIG. 4B, so that a decreasing area of each magnet 78 overlaps each wire coil section 82.

The movement of the magnets 78 create a change in the area cutting magnetic flux $\Phi_B$ across the wire coil sections 82, where magnetic flux $\Phi_B$ is measured in units of webers/sec. According to Faraday's law, the current, I, induced by a change in magnetic flux is equal to:

$$I = \frac{-\partial \phi_B}{R},$$

where R is the resistance of the wire coil sections 82 in ohms. The negative sign in the above equation indicates that the direction of the generated current opposes the change in the magnetic flux $\Phi_B$ that produced it. As further described in Lenz's law, if the magnetic flux $\Phi_B$ across a wire decreases, the induced current flows in a direction to set up a magnetic field in parallel with the decreasing magnetic flux. When the magnetic flux $\Phi_B$ across a wire increases, the induced current flows in a direction to set up a magnetic field opposing the increasing magnetic flux.

Since the magnetic flux across the wire coil sections 82 is decreasing as the magnets 78 move away from the wire coil sections 82 in FIG. 4B, the current flows in a direction to set up a parallel field with the decreasing magnetic flux. As the piston 48 continues to move in an upward axial direction (as shown in FIG. 3D), the magnets 78 will continue to move across the wire coil sections 82 and induce a current in a direction to set up a parallel field. The current will continue to be generated until the piston 48 reaches its extreme position (as shown in FIG. 3E). At this point, the piston 48 momentarily stops, along with the magnets 78. Because the magnets 78 are no longer in motion, there is no change in the magnetic flux across the wire coil sections 82, and no current is generated.

The piston 48 then reverses direction and begins to move axially in a downward direction (as shown in FIG. 3A). The magnets 78 thus begin to again overlap the wire coil sections 82 and generate an increasing magnetic flux across the wire coil sections 82, as shown in FIG. 4D. This induces a current in the wire coil sections 82 in an opposite direction such that the current sets up a field that opposes the increasing magnetic flux. Finally, at the extreme lower position of the piston 48 (shown in FIG. 3B), the movement of the magnet 78 again ceases momentarily. As a result, there is no change in magnetic flux across the wire coil sections 82, and the current flow is equal to zero.

Figure 4C:
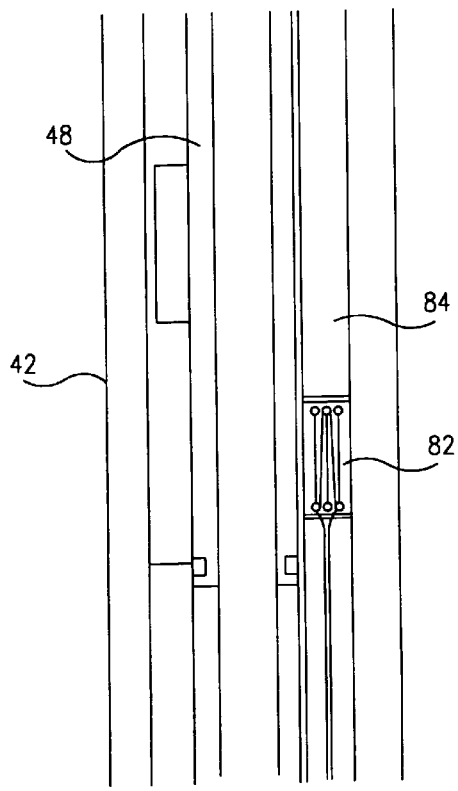
Figure 4D:
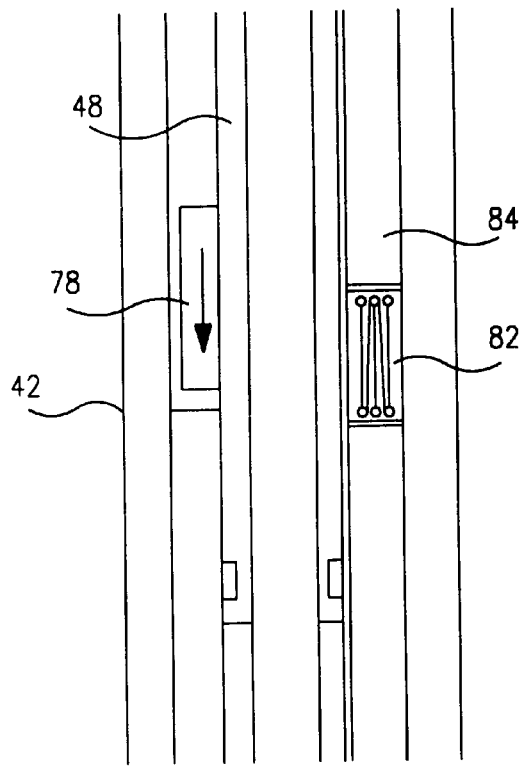
Figure 4E:
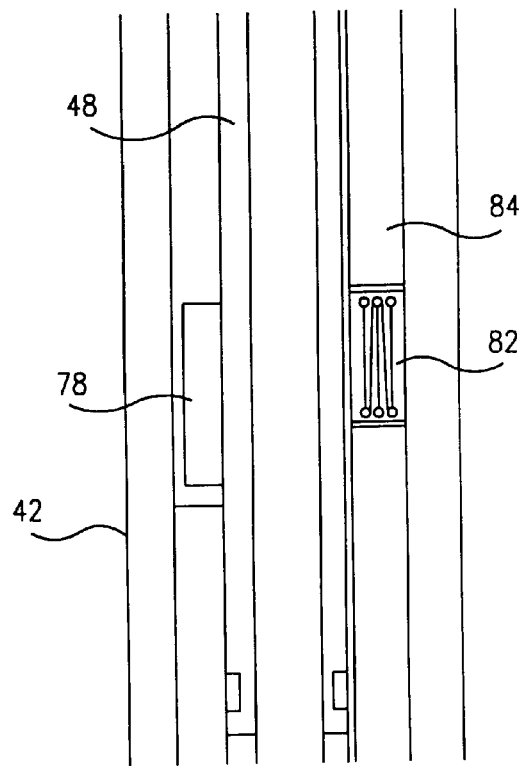
Figure 6A:
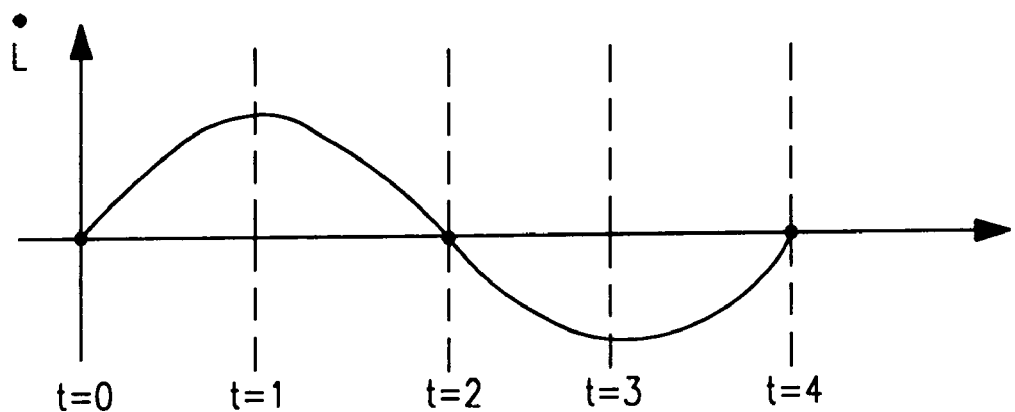
FIGS. 6A illustrates an example waveform of current generated by the alternator section of FIGS. 4A–E.

An example of an alternating current which may be produced by the alternator section 38 in FIG. 4A through 4E is illustrated in FIG. 6A. A person of ordinary skill in the art will appreciate that the shape of the waveform in FIG. 6A may vary depending on the acceleration of the piston 48, the shape of the magnetic field generated, and the shape of the coils as they oscillate within the housing 42. At t=0, the magnet 78 is at the position shown in FIG. 4A where there is no movement, or no overlap of the wire coils and magnetic fields, and no current is generated. Thus, at t=0, the current equals zero. At t=1, the magnets 78 are moving away from the wire coil sections 82 as depicted in FIG. 4B, and the current is in a first direction to set up a magnetic field in parallel to the decreasing magnetic flux. This direction is denoted as a positive current in FIG. 6A. At t=2, the magnets 78 momentarily cease movement at the upper most axial position of the piston 48, as shown in FIG. 4C. The magnetic flux is no longer changing across the wire coil sections 82, and the current again equals 0. As the magnets 78 move axially downward toward the wire coil sections 82, a current is induced in a direction to set up an opposing magnetic field to the increasing magnetic flux generated by magnets 78. This direction is denoted as negative at t=3 in FIG. 6A. Finally, the magnets 78 slow prior to reaching their lowest point, which generates a decreasing current. When the magnets 78 reach their lowest most point at t=4, shown in FIG. 4E, the movement of the magnets 78 again momentarily ceases. As a result, the magnetic flux is no longer changing, and the current flow falls to zero again.

Figures 5A, 5B:
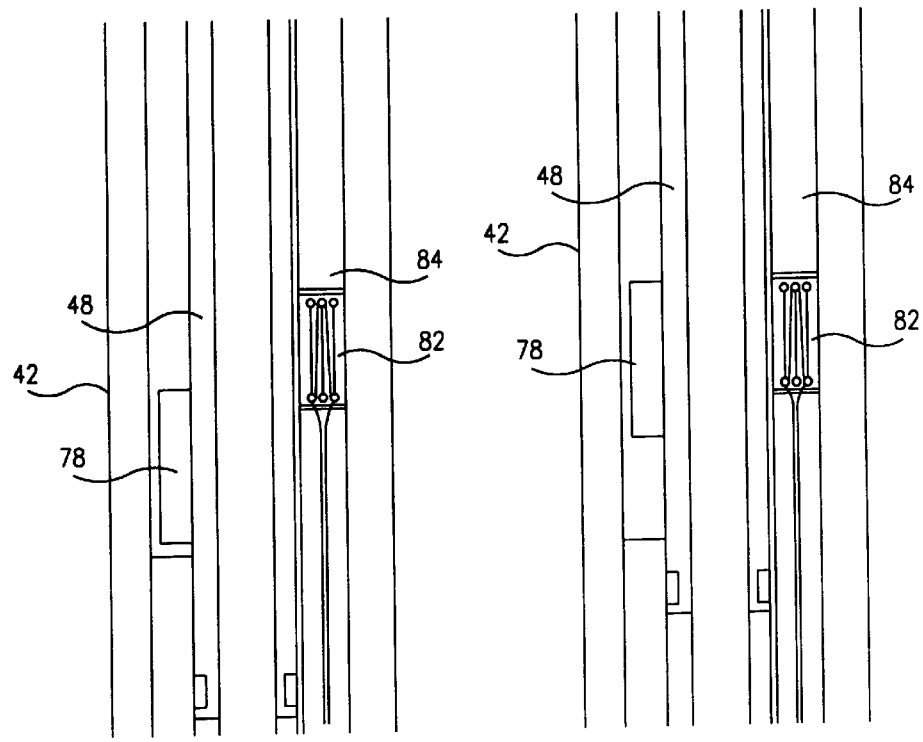
Figure 5C:
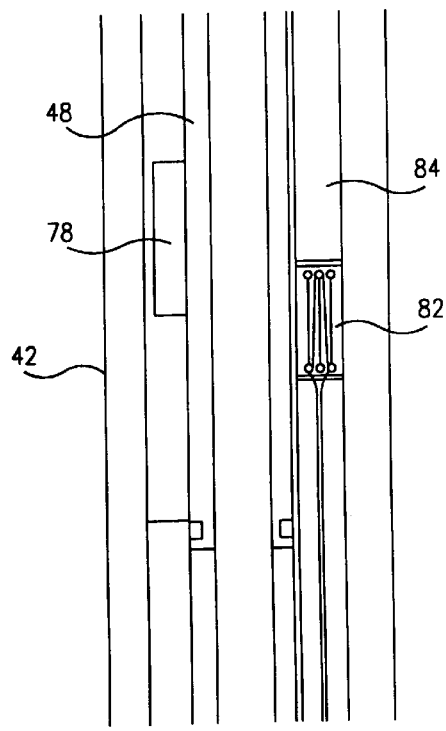

An alternative embodiment of the alternator section 38 is shown in FIGS. 5A through 5E. In this embodiment, the magnets 78 and the wire coil sections 82 are positioned such that the magnets 78 completely cross over the wire coil sections 82 during each oscillation. At the lowest position of the piston 48 (depicted in FIG. 3B), the magnets 78 in FIG. 5A are positioned below the wire coil sections 82. In FIG. 5B, the piston 48 begins to move upward in an axial direction, and the magnets 78 begin to move across the wire coil sections 82. This creates an increasing magnetic flux across the wire coil sections 82. A current is induced in the wire coil sections 82 in a direction which sets up a field to oppose the increasing magnetic flux. In FIG. 5C, the magnet 78 completely overlaps the wire coil section 82. When the magnets 78 completely overlap the wire coil sections 82, there is no change in the magnetic flux across the wire coil sections 82 and as such, no current is generated. As the magnets 78 move away from the wire coil sections 82, as shown in FIG. 5D, the magnetic flux decreases and current is again induced in the wire coil sections 82. The current flow is now in the opposite direction such that the current sets up a field to reinforce the decreasing magnetic flux of the magnets 78. Finally, in FIG. 5E, the piston 48 is at its upper most position axially and the magnets 78 no longer overlap the wire coil sections 82. As a result, there is no change in magnetic flux across the wire coil sections 82 and, hence, no current is generated.

Figure 6B:
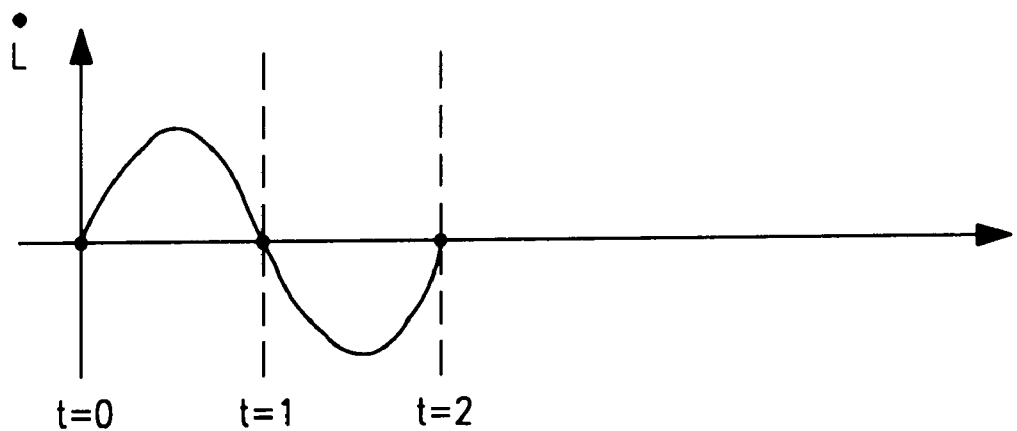
FIG. 6B illustrates an example waveform of current generated by the alternator section of FIGS. 5A–E.

An example waveform of the alternating current generated by the alternator section 38 of FIGS. 5A through 5E is shown in FIG. 6B. Because the magnets 78 completely cross over the wire coil sections 82, a current flow is induced in first one direction and then in the other direction in the wire coil sections 82 during a single, unidirectional oscillation of the piston 48. Thus, the frequency of the current induced is twice that of the alternator section 38 of FIG. 4A through 4E for the same acceleration and stoke length of the piston 48.

The frequency and amplitude of the alternating currents shown in FIGS. 6A and 6B may be regulated by altering the acceleration of the piston 48. Since the induced current is proportional to the change in the magnetic flux $\Phi_B$, the amplitude of the alternating current generated may be increased by increasing the rate of change of magnetic flux $\Phi_B$. This may be accomplished by increasing the acceleration of the piston 48 and thus the acceleration of the magnets 78 across the wire cross sections 82. As the acceleration of the magnets 78 is increased, the change in the magnetic flux across the wire coil sections 82 increases over time. This acceleration of the magnets 78 also increases the frequency of the induced alternating current. To increase the acceleration of the piston 48, state surface pumps may pump fluid into the well to increase the pressure in the interior volume 50 of the drill string 30 which in turn increases the rate of fluid flow in the housing 42.

The alternating current generated by the alternator section 38 may be converted into direct current (DC) with an AC to DC convertor, as is well known in the art. The resulting current may be used to recharge batteries, or to temporarily replace the batteries to increase their longevity. In addition, the current may be used by a high power circuit requiring more power than that obtainable from the batteries in the downhole power source. The present invention thus increases the longevity of downhole batteries and enables the use of higher power circuits which was not previously possible. Furthermore, the alternator section 38 has an efficient design which may be implemented without much cost. The current generator 34 requires no turbine so there are no internal flow restrictions. Furthermore, the current generator 34 has no battery imposed temperature limitations and thus it may be used in environments having increased operating temperatures.

Figure 7A:
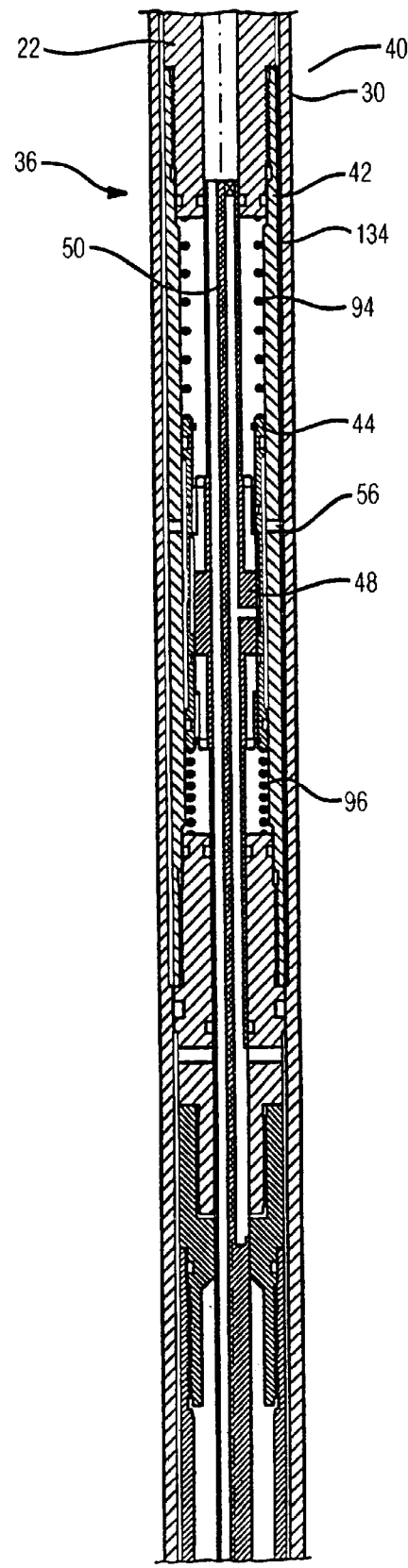
FIG. 7A illustrates a half sectional view of a power section of a downhole current generator of the present invention used within a probe.

FIG. 7 depicts an alternate embodiment of the current generator of the present invention shown is mounted in a probe 122. The power section 36, shown in FIG. 7A, includes the housing 42, and the piston 48 slidably disposed within sleeve 44 and housing 42. Between the pipe string 30 and the housing 42 is an annular chamber 134 which is in fluid communication with the fluid passageway 56 of the housing 42. The annular chamber 134 provides an outlet for the fluid pumped into the interior volume 50 during operation of the power section 36.

Figure 7B:
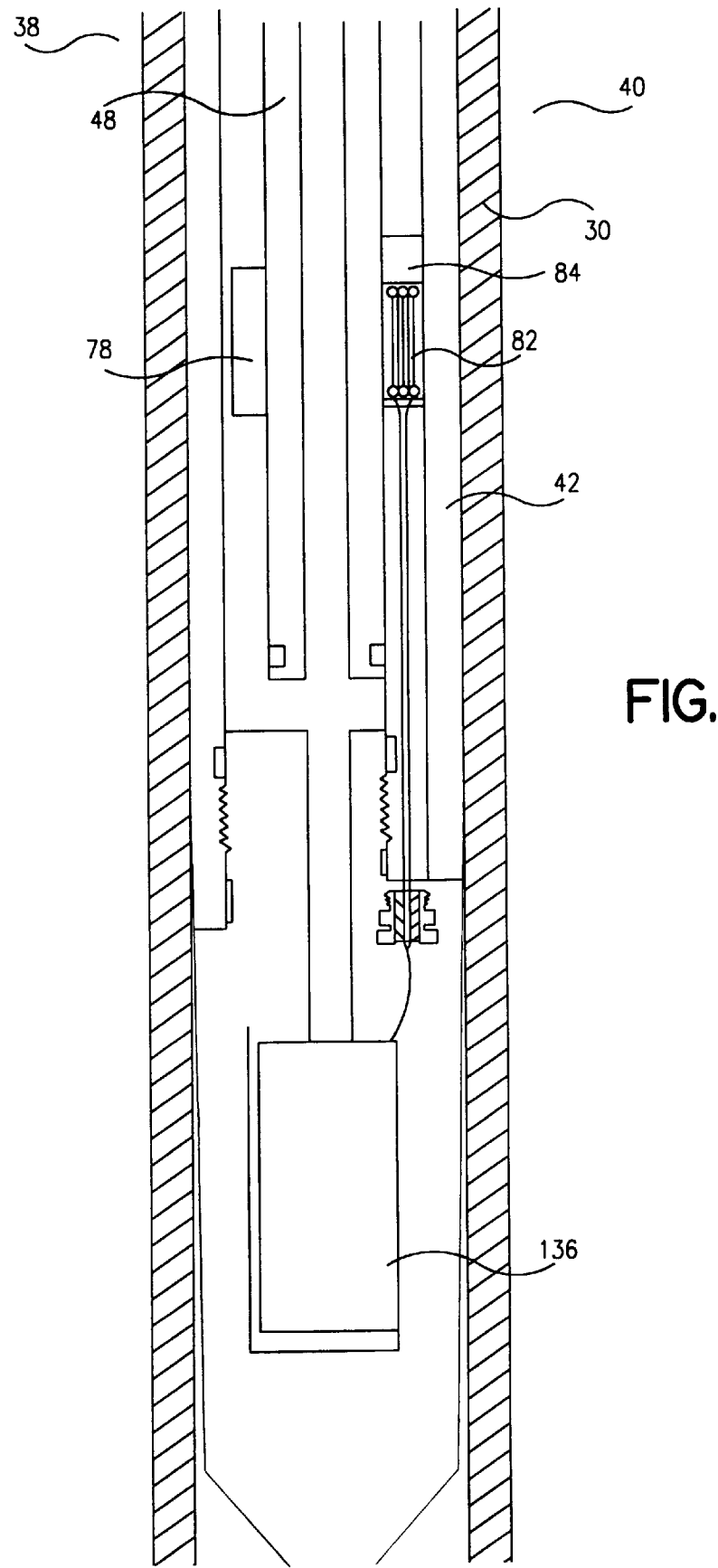
FIG. 7B illustrates a half sectional view of a generator section of a downhole current generator of the present invention used within a probe.

The alternator section 38, shown in FIG. 7B, includes the housing 42, the piston 48, the magnets 78 attached to the piston 48 and the finger pieces 84 with the wire coil sections 82 attached thereto. As the piston 48 travels upward relative to the housing 42, a change in magnetic flux from the magnets 78 induces a current in the wire coil sections 82. The generated current is conducted by wires to a transducer circuit 136 which measures conditions such as pressure or temperatures within the wellbore 40. The transducer circuit 136 may include an AC to DC convertor if necessary. The generated current may be used as a temporary alternate power source for the transducer circuit 136 or to recharge batteries used in the transducer circuit 136.

Figure 8A:
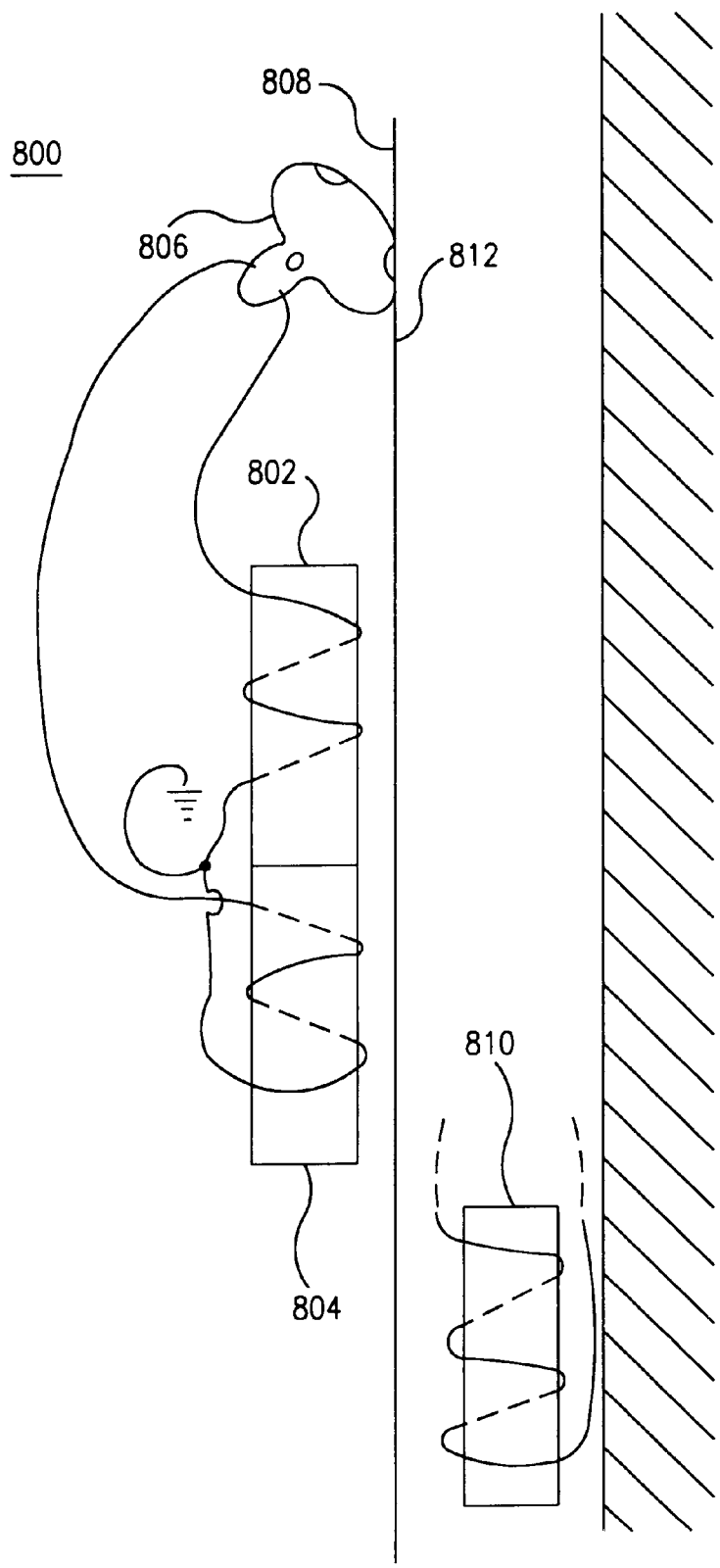
FIG. 8A illustrates a generator section which directly produces a direct current.

FIGS. 8A, C, and D illustrate three embodiments of a generator section which can be attached to the power sections described above. Unlike the previously described alternator sections, the generator sections shown in FIGS. 8A–D generate a direct current without the need for an AC-to-DC convertor. The generator 800, shown in FIG. 8A, contains the coils 802 and 804, which are attached to the switch/contact 806. The coils 802 and 804 are also attached to the power section (not shown in FIG. 8A), and oscillate up and down with the motions of the power section. The coils 802 and 804 both contain numerous windings, with the coil 802 being wound in the opposite direction of the coil 804. Fixed to the housing 808 is a static coil 810. The static coil 810 has a direct current flowing through it, and, as a consequence, generates a magnetic field. In other embodiments, the static coil 810 can be replaced by a permanent magnet.

In operation, the coils 802 and 804 oscillate through the magnetic field created by the static coil 810. During each upward and downward pass through the magnetic field, only one of the coils 802 and 804 will be electrically active. Which coil is active depends upon the position of the switch/contact 806. For example, when the power section is moving downward, the contact/switch 806 will rotate so that only coil 804 is electrically active. The switch/contact 806 accomplishes this by putting the coil 804 in contact with the conductive area 812 located on the inside of the housing 808. When the switch/contact 806 is in this position, a current will be induced in the coil 804 by the magnetic field created by the static coil 810. This current will flow through the contact portion of the switch/contact 806, to the conductive area 812. Pumps, instruments, and other device requiring electricity can be attached to the conductive area 812 to receive current.

Eventually, the power section begins to travel upward. The switch/contact 806 then rotates and places the coil 802 in contact with the conductive area 812. As the coil 802 travels through the magnetic field of the static coil 810, current is induced in the coil 802 in the same manner as current was induced in the coil 804. Also, since the coils 802 and 804 are wound in opposite directions, the direction of the current flowing through the switch/contact 806 is the same as when the coil 804 is electrically connected to the conductive area 812. This is due to the coils 802 and 804 being wound in opposite directions. In this manner, a sinusoidal direct current is conducted by the switch/contact 806 to the conductive area 812.

Figure 8B:
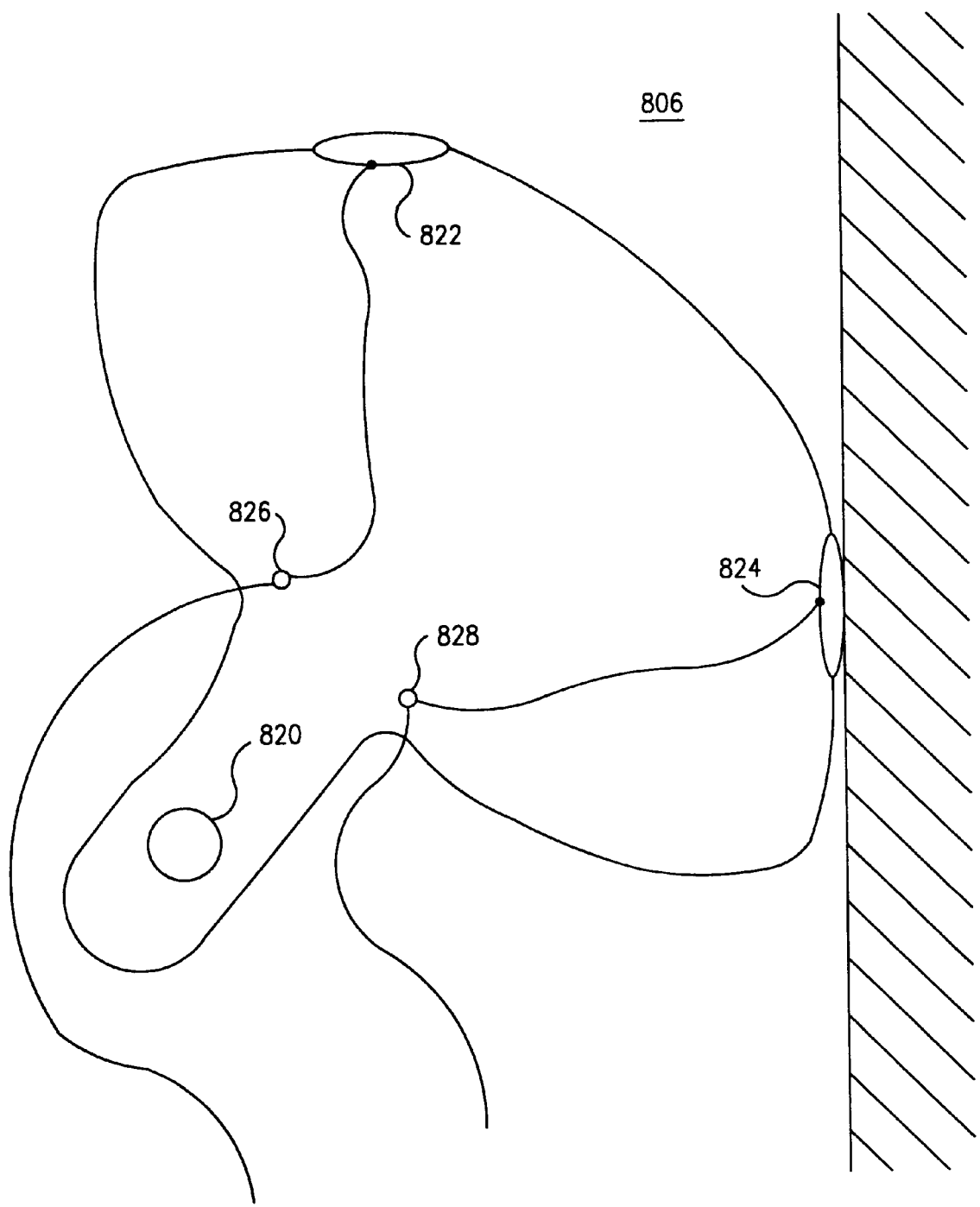
FIG. 8B is a more detailed view of a section of the generator section shown in FIG. 8A.

FIG. 8B illustrates the switch/contact 806 in greater detail. The switch/contact 806 is pivotally connected to the power section at a pivot point 820. The switch/contact 806 also contains the contacts 822 and 824, as well as the electrical connections 826 and 828. The electrical connections 826 and 828 are each connected to one end of the windings of the coils 802 and 804, respectively. Also, the electrical connections 826 and 828 are electrically connected to the contacts 822 and 824, respectively. The contacts 822 and 824 are alternately in contact with the conductive area 812 of the generator section, depending upon the motion of the power section. When the power section is moving down, the switch/contact 806 rotates about the pivot point 820 (due to friction), so that the contact 824 is electrically continuous with the conductive area 812. Likewise, when the power section reaches bottom and begins to move upward, the switch/contact 806 rotates downward and places the contact 822 in contact with the conductive area 812.

Figure 8C:
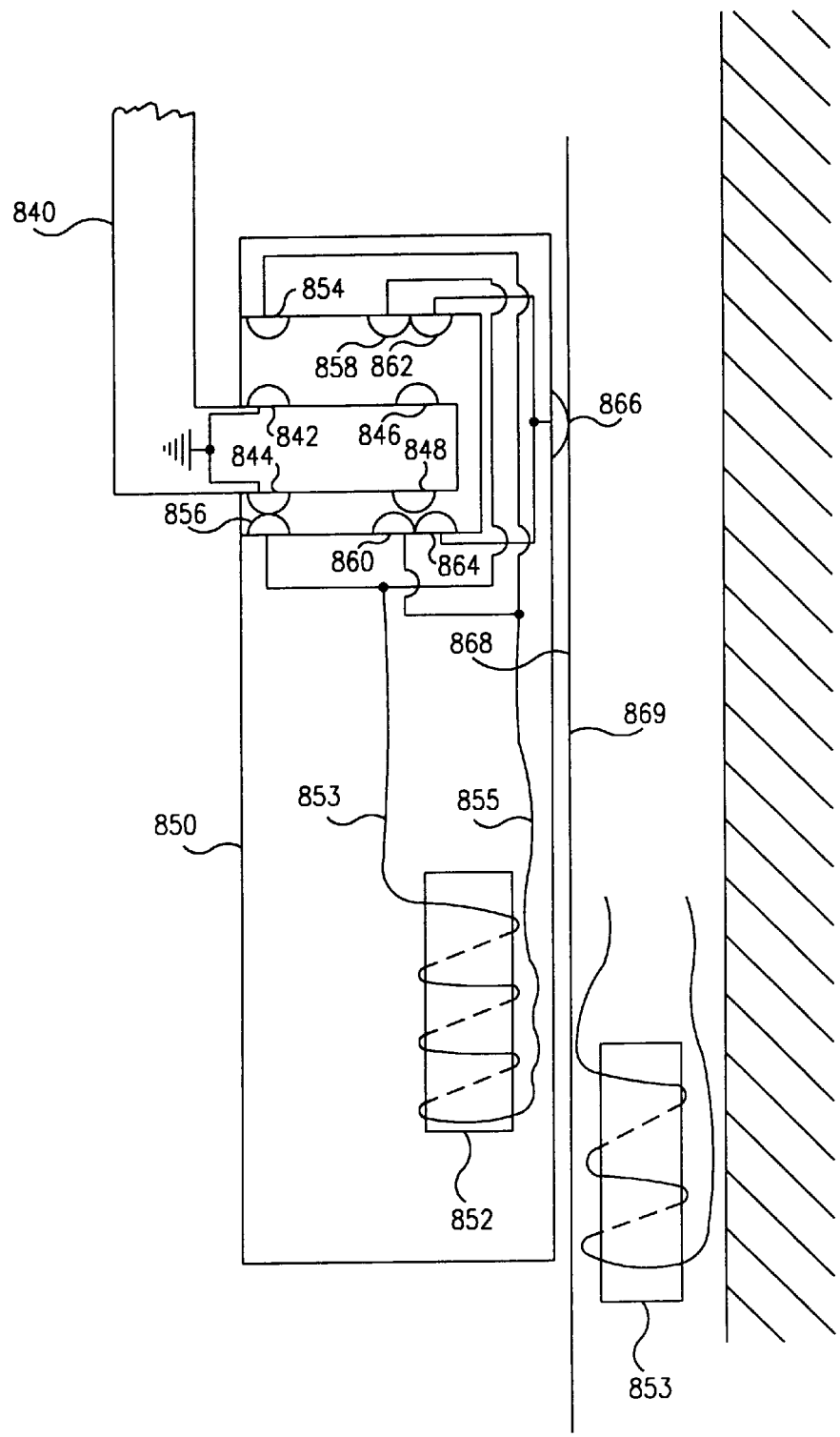
FIG. 8C depicts an alternate embodiment of a generator section which directly generates direct current.

FIG. 8C depicts another embodiment of a generator section which directly produces direct current. An arm 840 is attached to the power generator, and moves up and down with the power generator. Attached to the end of the arm 840 are four contacts: 842, 844, 846, and 848. These four contacts reside within a slot in the upper end of the coil assembly 850. The coil assembly 850 contains a single coil 852, which is permanently electrically connected to the contacts 854, 856, 858, 860. The contacts 862 and 864 are also located on the coil assembly 850, but are selectively put into contact with the contacts 858 and 860, depending upon the position of the arm 840. The contacts 862 and 864 are permanently electrically connected to the primary contact 866. The primary contact 866, in turn, is connected to the conductive area 868, which is located on the inside of the housing 869. A static coil 853 creates a magnetic field and imparts a current to the coil 852 when the coil 852 is in motion.

In operation, the arm 840 alternately moves up and down. When moving down, the contacts 844 and 848 on the arm 840 are in contact with the contacts 856, 860, and 864 of the coil assembly 850, with the contact 848 electrically joining the contacts 860 and 864. In this manner, when the arm 840 moves downward, a current is generated in the coil 852, due to the magnetic field created by the static coil 853. This current flows through the primary contact 866 to the conductive area 868. When the arm 840 has moved to its maximum downward position, it begins to move upward. When the arm 840 starts to move upward, it disengages from the contacts 856, 860, and 864, and engages the contacts 854, 858, and 862 with contacts 842 and 846. The contact 846 electrically connects the contacts 858 and 862. During this upward movement of the coil 852, current will be generated which flows in the same direction as it did when the arm 840 was moving the coil assembly 850 downward. The current flows in the same direction because the electrical leads 853 and 855 of the coil 852 are reversed from when the coil 852 was moving downward. Whereas the lead 853 was connected to ground when the coil 852 was moving downward, the lead 853 is connected to the primary contact 866 when the coil 852 moves upward. The lead 855 is switched from one connection to the other in a similar manner. Due to this switching action (which is caused by the movements of the arm 840), a sinusoidal direct current will flow out of primary contact 866, as was the case for the generator shown in FIG. 8A.

Figure 8D:
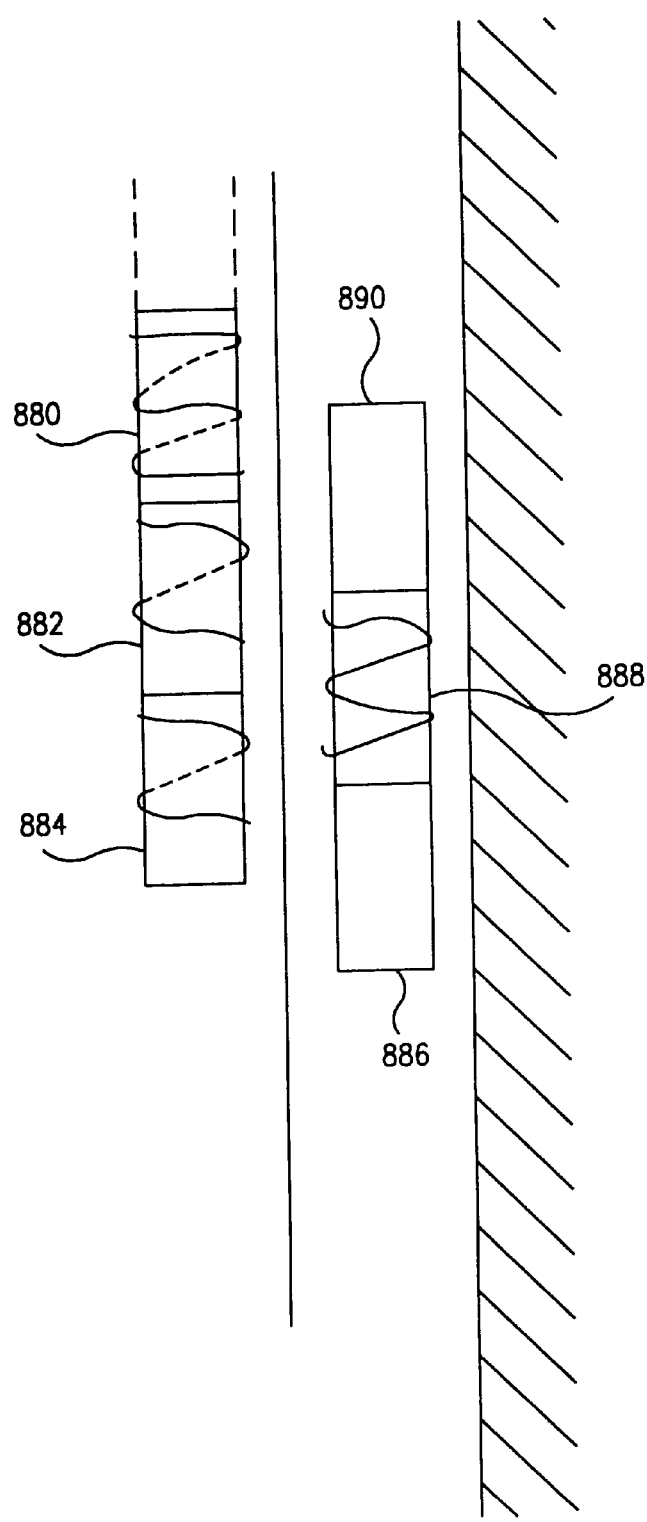
FIG. 8D illustrates yet another embodiment of a generator section which directly generates direct current.

FIG. 8D illustrates a third embodiment of a direct current generator. The coils 880 and 884, and the electromagnet 882 are connected to the power section, and move up and down relative to the permanent magnets 886 and 890, and the static coil 888. When moving downward, the permanent magnets 886 and 890 generate a current in a first direction in the coils 880 and 884. This current is used to power the electromagnet 882. The electromagnet 882 will then create a magnetic field having a first polarity. The magnetic field created by the electromagnet 882 will then induce a current in the static coil 888. This current can then be used to power instruments or other devices. When the coils 880 and 884 begin to move upward, the permanent magnets 886 and 890 will create a current in a second direction in the coils 880 and 884. Again, this current is used to energize the electromagnet 882. The polarity of this magnetic field is opposite to the polarity of the field created when the electromagnet was moving downward. However, because the electromagnet 882 is moving in an opposite direction relative to the static coil 888, the direction of the current generated in the static coil 888 is the same, regardless of whether the electromagnet 882 is moving up or down. It should be appreciated that a system similar to that shown in FIG. 8D could be created with a single coil and a single permanent magnet.

Referring next to FIGS. 9A and 10A, an alternate embodiment of the power section 138 of the current generator 34 is depicted. The power section 138 includes a housing 142 and a mandrel 144 which are slidably disposed within the housing 142, wherein the mandrel 144 has an inner cylindrical surface 140 which defines an interior volume 50. The mandrel 144 also defines a hole 146 which extends between an upper annular radially extending the shoulder 150 and a lower annual radially extending shoulder 160. The mandrel 144 has an upper outer cylindrical surface 162 extending above the shoulder 150, a central outer cylindrical surface 164 extending between the shoulder 150 and the shoulder 160, and a lower outer cylindrical surface 166 which extends below the shoulder 160. Between the housing 142, the shoulder 150 and the surface 162 is the upper chamber 152. Between the housing 142, the shoulder 160 and the surface 166 is a lower chamber 154.

The housing 142 defines a fluid passageway 156 which is in fluid communication with the wellbore 40. The mandrel 144 defines a fluid passageway 158 which is in fluid communication with the interior volume 50. The mandrel 144 also has an upper fluid passageway 168 and a lower fluid passageway 170 which is in communication with the fluid passageway 156 of the housing 142. Between the piston 148 and the mandrel 144 is an upper volume 176 and a lower volume 178.

In operation, the upper fluid passageway 168 of the mandrel 144 is alternatively in communication with an upper volume 176 and an upper fluid passageway 172 of the piston 148. The lower fluid passageway 170 of the mandrel 144 is alternately in communication with the lower volume 178 and the lower fluid passageway 174 of the piston 148. The fluid passageway 158 of the mandrel 144 is alternately in fluid communication with the upper fluid passageway 172 and the lower fluid passageway 174 of the piston 148 as the mandrel 144 oscillates relative to the housing 142.

On the downward stroke of the piston 148 and the mandrel 144, high pressure fluid from the interior volume 50 enters the upper chamber 152 through the fluid passageway 158 of the mandrel 144 and the upper fluid passageway 172 of the piston 148 and fluid from the lower chamber 154 exits into the wellbore 40 first through the passageway 156 in the housing 142, thence through the lower fluid passageway 170 of the mandrel 144 and finally through the lower fluid passageway 174 of the piston 148. The piston 148 travels downward until contact is made between the piston 148 and the shoulder 180 within housing 142. The mandrel 144 continues to travel downward until the fluid passageway 158 of the mandrel 144 is in fluid communication with the lower fluid passageway 174 of the piston 148, the upper fluid passageway 168 of mandrel 144 is in fluid communication with the upper fluid passageway 172 of the piston 148 and the lower fluid passageway 170 of the mandrel 144 is in fluid communication with the lower volume 178.

On the upward stroke of the piston 148 and the mandrel 144, high pressure fluid from the interior volume 150 enters the lower chamber 154 through the fluid passageway 158 in the mandrel 144 and the lower fluid passageway 174 in the piston 148. While fluid from the upper chamber 152 enters the wellbore 40 through the upper fluid passageway 172 of the piston 148 and the upper fluid passageway 168 of the mandrel 144. The piston 148 travels upward until contact is made between the piston 148 and the shoulder 182 of the housing 142. The mandrel 144 continues to travel upward until the fluid passageway 158 of the mandrel 144 is in communication with the upper fluid passageway 172 of the piston 148, the upper fluid passageway 168 of the mandrel 144 is in communication with the upper volume 176 and the lower fluid passageway 170 of the mandrel 144 is in fluid communication with the lower fluid passageway 174 of the piston 148. In addition, the upper and the lower coil springs (not pictured) may downwardly and upwardly bias the piston 148 respectively.

FIGS. 9B and 10B illustrate a modified version of the power section shown in FIGS. 9A and 10A. Whereas the power section shown in FIGS. 9A and 10A is designed to operate when the tubing pressure is greater than the annulus pressure, the power section shown in FIGS. 9B and 10B operates when the annulus pressure is greater than the tubing pressure. This manner of operation is achieved by removing ports 158, 168, and 170, as shown in FIG. 10A, and replacing them with ports 158b, 168b, and 170b, as depicted in FIG. 10B. Changing the location of the ports described above allows fluid to enter into the interior volume 50 of the power section 138 from the wellbore 40, thereby causing the power section 138 to oscillate and do work.

While the invention has been described herein relative to its preferred embodiments, it is of course contemplated that modifications of, and alternatives to, these embodiments, such modification and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A downhole current generator for generating current in a wellbore, comprising:
   a power section, including:
   a first housing;
   a sleeve slidably disposed within said first housing such that said sleeve oscillates axially within said first housing in response to changes in fluid pressure across the power section; and
   a piston slidably disposed within said sleeve to oscillate axially relative said sleeve and said first housing;
   an generator section, including:
      a second housing attached to said power section and defining an interior volume into which said piston of said power section extends;
      at least two magnets attached to said piston such that said at least two magnets oscillate in response to the oscillation of said piston; and
      a wire coil section fixed relative to said second housing of said generator section and positioned to overlap said at least two magnets.

2. The downhole current generator of claim 1 wherein said generator section further includes alternating finger pieces extending longitudinally along said second housing of said generator section and further defining grooves between the finger pieces.

3. The downhole current generator of claim 2 wherein said at least two magnets are attached to said piston to oscillate within said grooves defined by said alternating finger pieces.

4. The downhole current generator of claim 3 wherein a bobbin is attached to said finger pieces and a wire coil is wrapped around said bobbin such that said at least two magnets generate a magnetic field perpendicular to the circumference of said wire coil.

5. The downhole current generator of claim 1 wherein said at least two magnets are fixedly attached to said piston with capscrews.

6. A method of generating power in a wellbore, comprising:
   oscillating a piston in a downhole current generator responsive to a differential in fluid pressure across the downhole current applied to said downhole current generator, wherein said step comprises the steps of:
      oscillating a sleeve which is slidably disposed within a housing of the power section of said downhole current generator responsive to the change in fluid pressure; and
      oscillating said piston relative to said sleeve and said housing responsive to the change in fluid pressure; and
   relatively oscillating at least one magnet relative to a wire coil section responsive to the oscillation of said piston to induce a current in said wire coil section.

7. The method of claim 6 further including the steps of:
   inserting a downhole current generator into a wellbore, wherein the downhole current generator includes a power section and an generator section; and
   applying fluid pressure to the downhole current generator.

8. The method of claim 7 wherein said step of applying a fluid pressure to said downhole current generator further includes the step of pumping fluid into the wellbore.

9. A downhole current generator for generating current in a wellbore, comprising:
   a power section, including:
      a first housing;
      a sleeve slidably disposed within said first housing such that said sleeve oscillates axially within said first housing responsive to changes in fluid pressure across the power section; and
      a piston slidably disposed within said sleeve to oscillate axially relative to said sleeve and said first housing;
   a generator section which generates a current responsive to oscillations of said piston in said power section.

10. The downhole current generator of claim 9 wherein said generator section comprises:
   at least one magnet which oscillates in response to the oscillation of said piston in said power section; and
   at least one wire coil section positioned in relation to said plurality of magnets such that a current is induced within said at least one wire coil section in response to oscillations of said plurality of magnets.

* * * * *

UNITED STATES PATENT AND TRADEMARK OFFICE
CERTIFICATE OF CORRECTION

PATENT NO. : 5,965,964  
DATED : October 12, 1999  
INVENTOR(S) : Skinner et al.

It is certified that error appears in the above-identified patent and that said Letters Patent is hereby corrected as shown below:

Drawings,  
Sheet 10, Fig. 7A replace reference numeral "22" with -- 122 --

Signed and Sealed this

Twenty-first Day of May, 2002

Attest:

Attesting Officer

JAMES E. ROGAN  
Director of the United States Patent and Trademark Office